H. E. EDWARDS.
CUSHION TIRE.
APPLICATION FILED SEPT. 25, 1913.
1,149,640.
Patented Aug. 10, 1915.
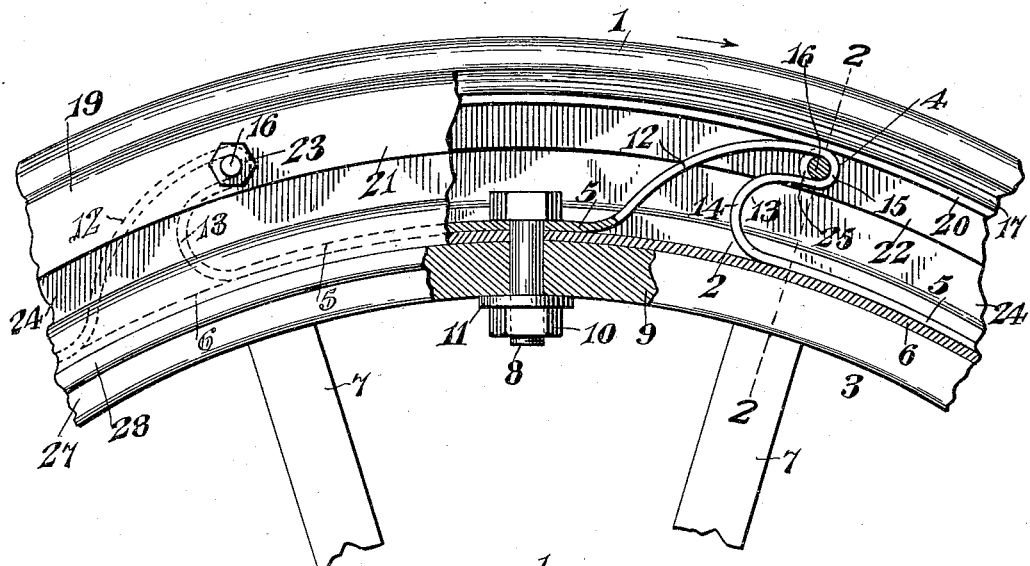
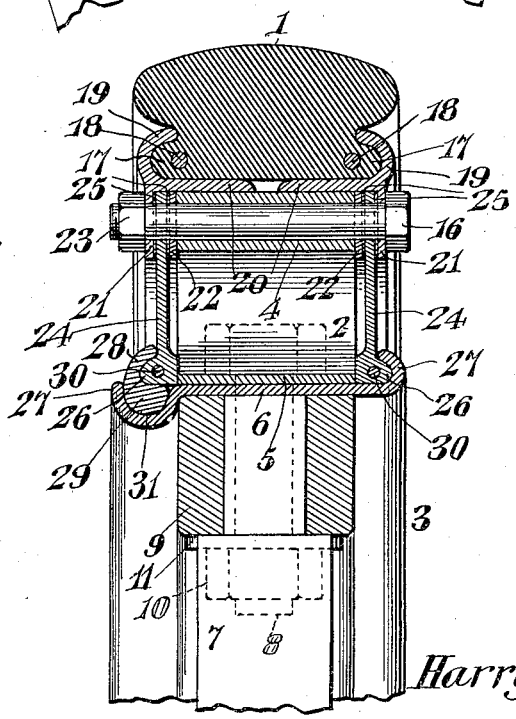
WITNESSES
Harry E. Edwards,
INVENTOR
BY
ATTORNEY

UNITED STATES PATENT OFFICE.

HARRY E. EDWARDS, OF WARREN, OHIO.

CUSHION-TIRE.

1,149,640. Specification of Letters Patent. Patented Aug. 10, 1915.

Application filed September 25, 1913. Serial No. 791,789.

*To all whom it may concern:*

Be it known that I, HARRY E. EDWARDS, a citizen of the United States, residing at Warren, in the county of Trumbull and State of Ohio, have invented a new and useful Cushion-Tire, of which the following is specification.

The invention relates to improvements in cushion tires for vehicle wheels.

The object of the present invention is to improve the construction of cushion tires for vehicle wheels, and to provide a simple, efficient and comparatively inexpensive cushion tire adapted to be substituted for the pneumatic tire of an ordinary vehicle wheel without necessitating any alteration in the construction of the latter, and capable of eliminating tire troubles, such as punctures and blowouts.

A further object of the invention is to provide a cushion tire of this character capable of affording the desired resiliency and cushioning action and of producing a smooth riding wheel and of increasing the life of the same.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing: Figure 1 is a side elevation partly in section of a portion of a wheel provided with a cushion tire, constructed in accordance with this invention. Fig. 2 is a transverse sectional view on the line 2—2 of Fig. 1.

Like numerals of reference designate corresponding parts in all the figures of the drawing.

In the accompanying drawing in which is illustrated the preferred embodiment of the invention, the cushion tire comprises in its construction a solid tire 1, and a cushioning spring 2, consisting of a single piece of flat spring material completely encircling a wheel 3 and composed of loops 4 arranged at intervals and connected by inner circumferentially curved members or portions 5, arranged flat against the rim 6 of the wheel 3 and secured to the latter between the spokes 7 thereof by bolts 8, piercing the attaching portions of the spring, the rim and the felly 9 of the wheel. The bolts 8, which are disposed radially of the wheel, are provided at their outer ends with heads to engage the spring and have threaded inner terminals for the reception of nuts 10, washers 11 being preferably interposed between the nuts and the inner periphery of the felly 9. While a single bolt is shown for securing each connecting portion 5 of the spring to the wheel, any number of bolts may be employed, depending, of course, on the size of the wheel and the distance between the spokes thereof. The wheel is designed to rotate in the direction of the arrow in Fig. 1 of the drawing, and the loops 4, which extend in the direction of the rotation of the wheel, are each composed of an outwardly curved rear portion 12 and a front approximately radially arranged S-shaped side or portion 13, consisting of inner and outer reversely arranged approximately semicircular bends 14 and 15. The inner and outer bends have approximately coincident diameters arranged substantially radially of the wheel, and the inner bend 14 is approximately twice the diameter of the outer bend, which receives a transverse bolt 16, but the relative size of the inner and outer semicircular bends 14 and 15 may be varied. The side or portion 12, which extends from the adjacent connecting portion 5 to the outer end of the S-shaped side or portion 13, is continuously curved and presents an outer convex face and an inner concave face. These two sides 12 and 13 of the loops cause the inner portions to taper outwardly and form a relatively narrow outer portion arranged circumferentially of the wheel. The spring loops are adapted to cushion the tire and absorb the shocks and jars and produce an easy running wheel.

The tire 1, which may be constructed or rubber, composition or any other suitable material, is provided at the inner portion of its sides with annular beads 17, preferably reinforced by annular steel wires 18 and gripped between curved outwardly extending annular flanges 19 of tire engaging bands 20, which constitute sections of an outer rim. The bands 20, which are spaced apart at the center of the inner face or tire 1, have inwardly projecting annular attaching flanges 21, which are pierced at intervals by the transverse bolts 16. The bolts 16 are connected and maintained in spaced relation and in the outer bends of the loops of the spring by metallic spacing rings 22, located at the side edges of the outer portions of the loops of the spring and maintained in tight engagement with the same by the bolts 16, which are provided with nuts 23. The bolts also pass through the outer portions of flexible annular side pieces or rings 24, arranged between the inner attaching flanges 21 of the tire engaging bands and the spaced rings 22, thin metallic steel washers 25 being preferably interposed between the flexible side rings, the flanges 21 and the spacing rings 22. The parts through which the bolts 16 pass are firmly clamped by the same to prevent any rattling of the parts and to relieve the same of friction.

The flexible side strips or rings, which cover or close the space between the tire engaging bands and the rim of the wheel at the sides thereof to exclude dust, mud and other accumulation from the interior of the cushion tire, are designed to be constructed of canvas, rubber, or any other suitable material, and they are provided at their inner edges with beads 26, located at opposite sides of the cushioning spring. The beads 26 have flat inner side faces to engage the side edges of the spring, and they are engaged by a flange 27 of the rim 2 and a flange or engaging portion 28 of a detachable ring 29. The beads 26, which are spaced apart by the spring to maintain them in engagement with the rim and the detachable ring 29, are preferably reinforced by steel wires 30, or other suitable means, and they have flat inner side faces to fit the spring and round outer side faces to conform to the configuration of the flange of the rim and the engaging portion of the detachable ring. The spring is of a width to extend across the rim from one side of the wheel to the other to enable it to operate as a spacing element for the annular flexible side pieces. The engaging flange 27 of the rim is located at one side of the wheel, and the rim is provided at the opposite side with the usual groove or channel 31 for the reception of the detachable ring. The detachable ring may be of the split type, or any other preferred construction, and the cushion tire is adapted to be applied to the ordinary pneumatically tired wheel when the pneumatic tire thereof is removed, and the device of the present invention does not necessitate any alteration in the construction of the wheel further than the provisions of the openings for the radial bolts 8. The terminals of the cushioning spring may be welded together or they may be secured to the rim and felly of the wheel by a bolt passed through the opening usually provided for the valve of the inner tube of a pneumatic tire.

What is claimed is:—

1. In a device of the class described, the combination with a rim, a tire arranged in spaced relation with the rim, and tire holding means having transverse fastening devices, of a cushioning spring supported by the rim and comprising tire cushioning loops arranged at intervals around the rim and extending from the rim to the tire holding means and receiving the transverse fastening devices thereof, said loops having approximately radially arranged S-shaped portions, and relatively long loop connecting members extending circumferentially around and presenting concave faces to the rim and spacing the loops beyond one another.

2. In a device of the class described, the combination with a rim, a tire arranged in spaced relation with the rim, and tire holding means having transverse fastening devices, of a continuous cushioning spring supported by the rim and comprising tire cushioning loops arranged at intervals around the rim and extending from the said rim and receiving the said transverse fastening devices, said cushioning loops having approximately radially arranged S-shaped portions consisting of inner and outer substantially semicircular bends with approximately coincident diameters, the inner bends being of greater size than the outer bends, and relatively long loop connecting members extending circumferentially around and presenting concave faces to the rim and spacing the cushioning loops beyond one another.

3. In a device of the class described, the combination with a rim and a tire arranged in spaced relation with the rim, of a cushioning spring extending entirely around the rim and comprising loops arranged at intervals and extending outwardly substantially at an inclination with respect to the rim and yieldably supporting the tire, circumferentially arranged portions connecting the loops and fitting flat against and presenting concave faces to the said rim of the same curvature as the latter, and transverse fastening means extending through the loops at the outer ends thereof and connecting the spring with the tire.

4. In a device of the class described, the combination with a rim and a tire, of tire retaining bands located at opposite sides of the tire and provided with means for engaging the same, a cushioning spring mounted on the rim and having portions fitting against and yieldably supporting the tire retaining bands, flexible side pieces covering the space between the bands and the rim, transverse fastening devices connecting the bands and passing through the flexible side pieces, and means carried by the rim for engaging the flexible side pieces at the inner edges thereof, said spring being of a width to extend across the rim and spacing the flexible side pieces and coöperating with the transverse fastening devices and the engaging means of the rim to hold the said flexible side pieces in position.

5. In a device of the class described, the combination with a rim and a tire, of tire retaining bands located at opposite sides of and engaging the tire, a cuhsioning spring mounted on the rim and having projecting portions yieldably supporting the tire, transverse fastening devices adjustably connecting the said bands, side rings having openings receiving the fastening devices to space the same and located at opposite sides of and directly engaging the springs, flexible side strips covering the space between the bands and the rim and pierced by the said fastening devices and clamped between the bands and the said rings, said spring spacing the rings and maintaining the same in engagement with the side pieces, and means carried by the rim for holding the inner edges of the flexible side pieces.

6. In a device of the class described, the combination with a rim and a tire, of a cushioning spring mounted on the rim and having projecting portions yieldably supporting the tire, flexible side pieces covering the spaces between the rim and the tire and provided at their inner edges with beads fitted against the side edges of the spring and spaced apart by the latter, means carried by the rim for engaging the beads to clamp the same against the side edges of the spring, and fastening means for securing the outer edges of the flexible side pieces.

7. In a device of the class described, the combination with a rim provided at one side with an outwardly projecting annular flange and having a channel at the opposite side, a tire arranged in spaced relation with the rim, of a cushioning spring mounted on the rim and having projecting portions yieldably supporting the tire, flexible side pieces covering the space between the tire and the rim and provided at their inner edges with beads, said beads having flat inner faces to engage the side edges of the spring and one of the beads being engaged with the flange of the rim, a detachable ring mounted in the channnel of the rim and engaging the other bead, said beads being maintained in engagement with the flange of the rim and with the detachable ring by the spring, and means for securing the outer edges of the flexible side pieces.

In testimony, that I claim the foregoing as my own, I have hereto affixed my signature in the presence of two witnesses.

HARRY E. EDWARDS.

Witnesses:
 MARGARET P. WILL,
 JULIUS N. CONDERY.

Copies of this patent may be obtained for five cents each, by addressing the "Commissioner of Patents, Washington, D. C."